(12) United States Patent
Kusudou et al.

(10) Patent No.: US 9,163,138 B2
(45) Date of Patent: Oct. 20, 2015

(54) HALOGEN-CONTAINING RESIN COMPOSITION, PRODUCTION PROCESS THEREFOR AND MOLDED ARTICLE THEREFROM

(75) Inventors: Takeshi Kusudou, Kurashiki (JP); Akira Tsuboi, Kurashiki (JP); Masato Nakamae, Okayama (JP); Yousuke Kumaki, Kurashiki (JP); Hideki Maki, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 132 days.

(21) Appl. No.: 13/990,964

(22) PCT Filed: Sep. 22, 2011

(86) PCT No.: PCT/JP2011/071730
§ 371 (c)(1),
(2), (4) Date: May 31, 2013

(87) PCT Pub. No.: WO2013/042267
PCT Pub. Date: Mar. 28, 2013

(65) Prior Publication Data
US 2013/0253116 A1     Sep. 26, 2013

(51) Int. Cl.
*C08K 5/053* (2006.01)
*C08L 27/06* (2006.01)

(52) U.S. Cl.
CPC ........................... *C08L 27/06* (2013.01)

(58) Field of Classification Search
CPC .......... C08K 5/053; C08K 5/098; C08K 3/18; C08L 27/06; C08L 29/04
USPC .................. 524/377, 387, 399, 432
See application file for complete search history.

(56) References Cited

U.S. PATENT DOCUMENTS

| | | | | |
|---|---|---|---|---|
| 3,991,135 | A * | 11/1976 | Kraft et al. ................... | 525/85 |
| 4,613,644 | A | 9/1986 | Moritani et al. | |
| 4,963,608 | A | 10/1990 | Kunieda et al. | |
| 5,070,128 | A * | 12/1991 | Gay .............................. | 524/357 |
| 5,234,981 | A * | 8/1993 | Arfiche et al. ................. | 524/265 |
| 8,252,860 | B2 * | 8/2012 | Kato et al. .................... | 524/399 |
| 2010/0190890 | A1 | 7/2010 | Michel et al. | |
| 2010/0256278 | A1 | 10/2010 | Harada et al. | |
| 2011/0086964 | A1* | 4/2011 | Kato et al. .................... | 524/399 |

FOREIGN PATENT DOCUMENTS

| | | | |
|---|---|---|---|
| EP | 2 348 070 | 4/2011 | |
| FR | 2.116.961 | 7/1972 | |
| JP | 50 92947 | 7/1975 | |
| JP | 54 81359 | 6/1979 | |
| JP | 57 147552 | 9/1982 | |
| JP | 60 238345 | 11/1985 | |
| JP | 1 178543 | 7/1989 | |
| JP | 6 287387 | 10/1994 | |
| JP | 9 3286 | 1/1997 | |
| JP | 9 31281 | 2/1997 | |
| JP | 2011 213939 | 10/2011 | |
| WO | 2009/010579 | 1/2009 | |
| WO | 2009 069491 | 6/2009 | |
| WO | WO 2009154178 A1 * | 12/2009 | ............. C08L 27/06 |

OTHER PUBLICATIONS

Iida, T., et al.,"Synergetic Effects of Poly(vinyl alcohol)s with Synergetic Metal Soap on the Stabilization of Poly(vinyl chloride)," Japanese Journal of Polymer Science and Technology, vol. 47, No. 3, pp. 197-205, (Mar. 1990) (with English abstract).
Iida, T., et al.,"Synergetic Effects of Saponificated Poly(vinyl acetate)s with Synergetic Metal Soap on the Stabilization of Poly(vinyl chloride),"Japanese Journal of Polymer Science and Technology, vol. 47, No. 6, pp. 509-516, (Jun. 1990) (with English abstract).
Iida, T., et al.,"Synergetic Effects of Ethylene-Vinyl Alcohol Copolymers with Synergetic Metal Soap on the Stabilization of Poly-(vinyl chloride),"Japanese Journal of Polymer Science and Technology, vol. 50, No. 2, pp. 65-72, (Feb. 1993) (with English abstract).
Ikeda, H., et al., "Dispersibility of Macromolecular Polyols as Co-Stabilizer in Poly and their Stabilization Effect Combined with Synergetic Metal Soap," Polymer & Polymer Composites, vol. 11, No. 8, pp. 649-662, (2003).
Nakamura, Y., et al., "Morphology and Mechanical Properties of PVC/PVA Blend," Journal of the Adhesion Society of Japan, vol. 43, No. 2, pp. 43-49, (2007) (with English abstract).
International Search Report Issued Nov. 22, 2011 in PCT/JP11/71730 Filed Sep. 22, 2011.
European Patent Application issued Feb. 2, 2014, in European Patent Application No. 11872763.5.

* cited by examiner

*Primary Examiner* — David W. Wu
*Assistant Examiner* — Marie Reddick
(74) *Attorney, Agent, or Firm* — Oblon, McClelland, Maier & Neustadt, L.L.P.

(57) ABSTRACT

The present invention provides a halogen-containing resin composition comprising 100 parts by weight of a halogen-containing resin; 0.01 to 2.5 parts by weight of a polyvinyl alcohol having a saponification degree of from 60 to 99.9 mol % and a viscosity-average polymerization degree of from 100 to 1,000; 0.01 to 2.5 parts by weight of a polyol having a molecular weight of 2,000 or less and a hydroxyl content of 10% by weight or more; and 0.01 to 5 parts by weight of a zinc compound.

17 Claims, No Drawings

HALOGEN-CONTAINING RESIN COMPOSITION, PRODUCTION PROCESS THEREFOR AND MOLDED ARTICLE THEREFROM

TECHNICAL FIELD

The present invention relates to a halogen-containing resin composition suitably used in common applications such as foods, medical applications and daily necessities, a production process therefor and a molded article therefrom. In particular, the present invention relates to a thermally stable halogen-containing resin composition which can provide a molded article with less coloration, a production process therefor and a molded article therefrom.

BACKGROUND ART

A halogen-containing resin as represented by a polyvinyl chloride resin is blended with a Ca—Zn based or Ba—Zn based stabilizer before being molded, and such molded articles are extensively used for a general purpose as well as foods, medical applications and the like.

However, since these stabilizers can insufficiently inhibit thermal deterioration of a halogen-containing resin, they have drawbacks such as coloration of a molded article immediately after molding and insufficient thermal stability during molding. Therefore, as a means for eliminating the drawbacks, there have been proposed halogen-containing resin compositions containing an antioxidant and/or a hydroxyl-containing compound.

Patent Reference No. 1 (JP 50-92947A) has disclosed a method of adding calcium soap, zinc soap, polyol or a derivative thereof, and a neutral inorganic calcium salt to a chlorine-containing resin.

Patent Reference No. 2 (JP 54-81359A) has disclosed a method of adding a water-soluble polymer to a chlorine-containing polymer.

Patent Reference No. 3 (JP 57-147552A) has disclosed a method of adding a condensation product of dipentaerythritol with a dicarboxylic acid, a zinc compound and hydrotalcite to a chlorine-containing resin.

Patent Reference No. 4 (JP 60-238345A) has disclosed a method of adding a saponified product of an ethylene-vinyl acetate copolymer having an ethylene unit content of from 20 to 50% and a saponification degree of a vinyl acetate unit of 96% or more, and a hydrotalcite-based compound to a thermoplastic resin such as a polyvinyl chloride.

Patent Reference No. 5 (JP 1-178543A) has disclosed a method of adding metal soap and a saponified product of an ethylene-vinyl acetate copolymer having a copolymer composition with an ethylene content of from 20 to 75 mol % and a saponification degree of vinyl acetate unit of 50 mol % or more to a halogen-containing thermoplastic resin.

Patent Reference No. 6 (JP 6-287387A) has disclosed a method of adding a metal salt of an organic acid and acetalized polyvinyl alcohol to a vinyl chloride-based resin.

Patent Reference No. 7 (JP 9-3286A) has disclosed a method of adding partially saponified polyvinyl alcohol having a saponification degree of from 70 to 95 mol %, having an average polymerization degree of from 300 to 2,000 and having a terminal mercapto group to a vinyl chloride-based resin.

Patent Reference No. 8 (JP 9-31281A) has disclosed a method of adding a zinc compound, hydrotalcites, polyvinyl alcohol, and polymethyl methacrylate to a vinyl chloride-based resin.

Non-Patent Reference No. 1 (Japanese Journal of Polymer Science and Technology Vol. 47, No. 3, p. 197 (1990)) has disclosed a method of adding zinc stearate-calcium stearate complex soap and completely saponified polyvinyl alcohol having a polymerization degree of 600 or more to polyvinyl chloride.

Non-Patent Reference No. 2 (Japanese Journal of Polymer Science and Technology Vol. 47, No. 6, p. 509 (1990)) has disclosed a method of adding zinc stearate-calcium stearate complex soap and partially saponified polyvinyl alcohol having a polymerization degree of 500 and having a saponification degree of 73.6 mol % to polyvinyl chloride.

Non-Patent Reference No. 3 (Japanese Journal of Polymer Science and Technology Vol. 50, No. 2, p. 65 (1993)) has disclosed a method of adding zinc stearate-calcium stearate complex soap and an ethylene-vinyl alcohol copolymer having an ethylene content of 29 mol % or more to polyvinyl chloride.

Non-Patent Reference No. 4 (Polymers & Polymer Composites, Vol. 11, p. 649 (2003)) has disclosed a method of adding zinc stearate-calcium stearate complex soap, and polyvinyl alcohol having a polymerization degree of 500 and having a saponification degree of 98.5 mol % or an ethylene-vinyl alcohol copolymer having an ethylene content of 29 mol % or more to polyvinyl chloride.

Non-Patent Reference No. 5 (Journal of the Adhesion Society of Japan Vol. 43, No. 2, p. 43 (2007)) has disclosed a method of adding polyvinyl alcohol having a polymerization degree of 500 and having a saponification degree of 88 mol % or polyvinyl alcohol having a polymerization degree of 1700 and having a saponification degree of 78 mol % or more, and polymethyl methacrylate to polyvinyl chloride.

The halogen-containing resin compositions described in Patent Reference Nos. 1 to 8 and Non-patent Reference Nos. 1 to 5 have the following problems.

Specifically, when a low-molecular-weight polyol is added, the low-molecular-weight polyol bleeds out in the surface during molding, which tends to cause troubles such as adhesion of a kneaded material to a screw surface inside of an extruder or the like during kneading. Furthermore, a molded article obtained tends to have troubles such as volatilization of a polyol, occurrence of blocking, reduction in transparency and reduction in adhesiveness and adherence.

When a high-molecular-weight polyol is added, dispersity of the high-molecular-weight polyol in a halogen-containing resin composition is insufficient, leading to insufficient thermal stability, particularly in molding at a relatively lower temperature.

PRIOR ART REFERENCES

Patent References

Patent Reference No. 1: JP 50-92947A.
Patent Reference No. 2: JP 54-81359A.
Patent Reference No. 3: JP 57-147552A.
Patent Reference No. 4: JP 60-238345A.
Patent Reference No. 5: JP 1-178543A.
Patent Reference No. 6: JP 6-287387A.
Patent Reference No. 7: JP 9-3286A.
Patent Reference No. 8: JP 9-31281A.

Non-Patent References

Non-Patent Reference No. 1: Japanese Journal of Polymer Science and Technology Vol. 47, No. 3, p. 197 (1990).

Non-Patent Reference No. 2: Japanese Journal of Polymer Science and Technology Vol. 47, No. 6, p. 509 (1990).
Non-Patent Reference No. 3: Japanese Journal of Polymer Science and Technology Vol. 50, No. 2, p. 65 (1993).
Non-Patent Reference No. 4: Polymers & Polymer Composites, Vol. 11, p. 649 (2003).
Non-Patent Reference No. 5: Journal of the Adhesion Society of Japan Vol. 43, No. 2, p. 43 (2007).

SUMMARY OF THE INVENTION

Problem to be Solved by the Invention

An objective of the present invention is to provide a halogen-containing resin composition which is thermally stable during molding and which can provide a molded article with reduced coloration, a production process therefor and a molded article therefrom.

Means for Solving Problem

As a result of intense investigation, we have found that a halogen-containing resin composition obtained by adding a particular polyvinyl alcohol, a particular polyol and a zinc compound in particular amounts to a halogen-containing resin, exhibits satisfactory thermal stability even when it is molded at a low temperature and molding of the halogen-containing resin composition gives a molded article with reduced coloration. After further investigation based on the findings, we have achieved the present invention.

The above problems can be solved by providing a halogen-containing resin composition comprising 100 parts by weight of a halogen-containing resin; 0.01 to 2.5 parts by weight of a polyvinyl alcohol having a saponification degree of from 60 to 99.9 mol % and a viscosity-average polymerization degree of from 100 to 1,000; 0.01 to 2.5 parts by weight of a polyol having a molecular weight of 2,000 or less and a hydroxyl content of 10% by weight or more; and 0.01 to 5 parts by weight of a zinc compound.

Preferably, a weight ratio of the polyvinyl alcohol to the polyol meets a condition of (a weight of the polyvinyl alcohol)/(a weight of the polyol)=30/70 to 90/10.

Preferably, the viscosity-average polymerization degree of the polyvinyl alcohol is 100 to 450.

Preferably, the halogen-containing resin composition contains the polyvinyl alcohol, the polyol and the zinc compound by adding them to the halogen-containing resin.

The above problems can be also solved by providing a process for producing a halogen-containing resin composition, comprising adding 0.01 to 2.5 parts by weight of a polyvinyl alcohol having a saponification degree of from 60 to 99.9 mol % and a viscosity-average polymerization degree of from 100 to 1,000; 0.01 to 2.5 parts by weight of a polyol having a molecular weight of 2,000 or less and a hydroxyl content of 10% by weight or more; and 0.01 to 5 parts by weight of a zinc compound, to 100 parts by weight of a halogen-containing resin.

The above problems can be also solved by a molded article made of the halogen-containing resin composition.

Advantage of the Invention

The halogen-containing resin composition of the present invention is sufficiently thermally stable even when it is molded at a low temperature and a sticky material on, for example, the inside of an extruder is reduced during molding. Furthermore, a molded article produced by molding the halogen-containing resin composition is less colored.

MODE FOR CARRYING OUT THE INVENTION

There will be described a halogen-containing resin composition according to the present invention, a production process therefor and a molded article therefrom.
Halogen-Containing Resin Examples of a halogen-containing resin used in the present invention include chlorine-containing resins such as polyvinyl chloride, polyvinylidene chloride, chlorinated polyvinyl chlorides, chlorinated polyolefins and vinyl chloride-vinyl acetate copolymers; and bromine-containing resins such as brominated polyolefins. These can be used alone or in combination of two or more, depending on an application of a molded article or the like, but in the light of availability, physical properties and so on, it is preferably a chlorine-containing resin, more preferably polyvinyl chloride or polyvinylidene chloride, further preferably polyvinyl chloride.

A starting monomer for producing the polyvinyl chloride can be vinyl chloride monomer alone or a mixture of 50% by weight or more of vinyl chloride monomer and another monomer copolymerizable therewith. Examples of another monomer copolymerizable with vinyl chloride include vinyl esters such as vinyl acetate and vinyl propionate; (meth)acrylic esters such as methyl acrylate and ethyl acrylate; olefins such as ethylene and propylene; maleic anhydride; acrylonitrile; styrene; vinylidene chloride.

A method for producing polyvinyl chloride using these monomers can be suitably, but not limited to, suspension polymerization of the monomers in the presence of a polymerization initiator. In the method, a dispersion stabilizer can be suitably used, including a water-soluble polymer such as a water-soluble cellulose ether including methylcellulose, hydroxyethylcellulose, hydroxypropylcellulose and hydroxypropylmethylcellulose, a polyvinyl alcohol and gelatin; an oil-soluble emulsifier such as sorbitan monolaurate, sorbitan trioleate, glycerin tristearate and an ethylene oxide-propylene oxide block copolymer; a water-soluble emulsifier such as polyoxyethylene sorbitan monolaurate, polyoxyethylene glycerin oleate and sodium laurate and the like. Among these, a polyvinyl alcohol can be preferably used.

A polymerization initiator can be an oil-soluble or water-soluble polymerization initiator conventionally used for polymerization of vinyl chloride monomer or the like. Examples of an oil-soluble polymerization initiator include percarbonate compounds such as diisopropyl peroxydicarbonate, di-2-ethylhexyl peroxydicarbonate and diethoxyethyl peroxydicarbonate; perester compounds such as t-butyl peroxyneodecanoate, t-butyl peroxypivalate, t-hexyl peroxypivalate and α-cumyl peroxyneodecanoate; peroxides such as acetyl cyclohexyl sulfonyl peroxide, 2,4,4-trimethylpentyl-2-peroxyphenoxyacetate, 3,5,5-trimethyl hexanoyl peroxide and lauroyl peroxide; azo compounds such as azobis-2,4-dimethylvaleronitrile) and azobis(4-methoxy-2,4-dimethylvaleronitrile). Examples of a water-soluble polymerization initiator include potassium persulfate, ammonium persulfate, hydrogen peroxide, cumene hydroperoxide. These oil-soluble or water-soluble polymerization initiators can be used alone or in combination of two or more.

Upon polymerization, various other additives can be added to a polymerization reaction system as necessary. Examples of such an additive include polymerization regulators such as aldehydes, halogenated hydrocarbons and mercaptans; polymerization inhibitors such as phenol compounds, sulfur compounds and N-oxide compounds; a pH adjustor; a crosslinker;

an antiseptic agent; a fungicide; an antiblocking agent; a defoamer; an antifouling agent; and an antistatic agent.

Upon polymerization, a polymerization temperature can be regulated to, but not limited to, a low temperature of about 20° C. as well as a high temperature of over 90° C. In one preferred embodiment, a polymerization vessel equipped with a reflux condenser is used for enhancing a heat removal efficiency of the polymerization reaction system.

Polyvinyl Alcohol

There are no particular restrictions, but a polyvinyl alcohol (hereinafter, sometimes simply referred to as "PVA") is suitably contained in the halogen-containing resin composition of the present invention by adding it to the halogen-containing resin obtained after polymerization of a monomer for preparing the halogen-containing resin. The PVA can be added as powder or as a solution of water or an organic solvent to the halogen-containing resin. If the PVA is added before or during polymerization of the monomer for forming the halogen-containing resin, the PVA acts as a dispersant for the monomer and the halogen-containing resin obtained, it may adversely affect quality of the halogen-containing resin such as an average particle size and plasticizer absorbability. Furthermore, most of the PVA may be removed by washing the resin after producing the halogen-containing resin, leading to reduction of the PVA in the halogen-containing resin composition and thus insufficient thermal stability.

A saponification degree of the PVA is 60 to 99.9 mol %, preferably 65 to 99 mol %, more preferably 70 to 99 mol %. If a saponification degree is less than 60 mol % or more than 99.9 mol %, long-term thermal stability is deteriorated. A saponification degree of the PVA was determined in accordance with JIS K6726.

A viscosity-average polymerization degree of the PVA (hereinafter, sometimes simply referred to as a "polymerization degree") is 100 to 1,000, preferably 150 to 800, more preferably 200 to 700. In particular, the upper limit of a polymerization degree of the PVA is further preferably 450 in the light of further thermal stability even when molding is conducted at a low temperature and further inhibition of adhesion of a sticky material on the inside of an extruder during molding. If a polymerization degree of the PVA is more than 1,000, long-term thermal stability is deteriorated. Technically, a PVA having a polymerization degree of less than 100 cannot be produced. A polymerization degree of the PVA was determined in accordance with JIS K6726. Specifically, it can be determined by the following equation from a limiting viscosity [η] (unit: deciliter/g) measured in water at 30° C. for the PVA after being re-saponified to 99.5 mol % or more of a saponification degree and then being purified.

$$\text{Polymerization degree} = ([\eta] \times 1000/8.29)^{(1/0.62)}$$

The PVA can be produced by polymerizing a vinyl ester monomer by employing a conventionally known process such as bulk polymerization, solution polymerization, suspension polymerization, emulsion polymerization and dispersion polymerization, and then saponifying the polyvinyl ester obtained. Polymerization processes preferred from the industrial perspective are solution polymerization, emulsion polymerization and dispersion polymerization. The polymerization can be operated by any of batch, semi-batch and continuous processes.

Examples of a vinyl ester monomer which can be used for the polymerization include vinyl acetate, vinyl formate, vinyl propionate, vinyl caprylate and vinyl versatate, and among these, vinyl acetate is preferred from the industrial perspective.

For the polymerization of the vinyl ester monomer, the vinyl ester monomer can be copolymerized with another monomer as long as not impairing the spirit of the present invention. Examples of another monomer which can be used include α-olefins such as ethylene, propylene, n-butene and isobutylene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide; acrylamide derivatives such as N-methylacrylamide, N-ethylacrylamide, N,N-dimethylacrylamide, diacetone acrylamide, acrylamide propanesulfonic acid and a salt thereof, acrylamide propyl dimethylamine and salts or quaternary salts thereof, and N-methylolacrylamide and derivatives thereof; methacrylamide; methacrylamide derivatives such as N-methyl methacrylamide, N-ethyl methacrylamide, methacrylamide propanesulfonic acid and salts thereof, methacrylamide propyl dimethylamine and salts or quaternary salts thereof, and N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid and fumaric acid, and salts or esters thereof; vinyl silyl compounds such as vinyl trimethoxysilane; and isopropenyl acetate.

In the polymerization of the vinyl ester monomer, a chain transfer agent can be incorporated in order to regulate the polymerization degree of the obtained PVA. Examples of the chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol; thiocarboxylic acids such as thioacetic acid; and halogenated hydrocarbons such as trichloroethylene and perchloroethylene, and among these, aldehydes and ketones can be suitably used. The amount of the chain transfer agent added varies depending on the chain transfer constant of the chain transfer agent added and the intended polymerization degree of the PVA; generally, it is desirably 0.1 to 10% by weight to a vinyl ester monomer used. When a thiocarboxylic acid or the like is used as a chain transfer agent, a functional group derived from the chain transfer agent may be introduced to the terminus of the vinyl ester polymer and saponified to give a PVA with a terminal SH group. However, the use of such a PVA is not significantly effective for improving thermal stability of a polyvinyl chloride resin composition obtained. It is, therefore, undesirable to use a thiocarboxylic acid as a chain transfer agent. Furthermore, it is preferable that the PVA is free from a terminal SH group.

In the present invention, it is also possible to use a PVA having a high content of 1,2-glycol bond that is obtained by polymerizing the vinyl ester monomer at a temperature condition higher than normal polymerization. In this case, the content of 1,2-glycol bond in the PVA is preferably 1.9 mol % or more, more preferably 2.0 mol % or more, and even more preferably 2.1 mol % or more. The upper limit of the content of 1,2-glycol bond is, for example, 3.0 mol %.

To the saponification reaction of the polyvinyl ester, an alcoholysis or hydrolysis reaction can be applied using a conventionally known basic catalyst such as sodium hydroxide, potassium hydroxide and sodium methoxide, or acidic catalyst such as p-toluenesulfonic acid. Examples of a solvent used for the saponification reaction include alcohols such as methanol and ethanol; esters such as methyl acetate and ethyl acetate; ketones such as acetone and methyl ethyl ketone; and aromatic hydrocarbons such as benzene and toluene, which can be used alone or in combination of two or more. Among these, it is convenient and preferable to carry out the saponification reaction using methanol or a mixed solution of methanol and methyl acetate as a solvent in the presence of sodium hydroxide as a basic catalyst.

A content of the PVA in the halogen-containing resin composition is 0.01 to 2.5 parts by weight, preferably 0.05 to 2 parts by weight based on 100 parts by weight of the halogen-containing resin. The PVA content of less than 0.01 part by weight leads to insufficient long-term thermal stability, while the content of more than 2.5 parts by weight leads to tendency to coloration of a molded article made of a halogen-containing resin composition.

The PVA used can be a composition containing an acid having a pKa of 3.5 to 5.5 at 25° C. and/or a metal salt thereof. There are no particular restrictions to the type of the acid; examples include acetic acid (pKa: 4.76), propionic acid (pKa: 4.87), butyric acid (pKa: 4.63), octanoic acid (pKa: 4.89), adipic acid (pKa: 5.03), benzoic acid (pKa: 4.00), formic acid (pKa: 3.55), valeric acid (pKa: 4.63), heptanoic acid (pKa: 4.66), lactic acid (pKa: 3.66), phenylacetic acid (pKa: 4.10), isobutyric acid (pKa: 4.63) and cyclohexanecarboxylic acid (pKa: 4.70). Among these, acetic acid, propionic acid and lactic acid are preferable. There are no particular restrictions to the type of the metal salt, and a salt of an alkali metal such as sodium and potassium, or a salt of an alkaline earth metal such as magnesium and calcium can be generally used.

The content of the above acid and/or the metal salt thereof is preferably 0.05 to 5 parts by weight, more preferably 0.1 to 3 parts by weight, and further preferably 0.15 to 2 parts by weight. If the content of the acid and/or the metal salt thereof is less than 0.05 part by weight based on 100 parts by weight of the PVA, it may lead to deterioration in long-term thermal stability, while if it is more than 5 parts by weight, it may leads to tendency to coloration of a molded article made of a halogen-containing resin composition.

The content of the acid and/or the metal salt thereof can be adjusted to a given value by, but not limited to, adjusting the type, the amount and the like of an alkali catalyst used in the above saponification reaction of the polyvinyl ester; adding or removing the acid and/or the metal salt thereof after producing the PVA; or the like.

Polyol

There are no particular restrictions, but a polyol is suitably contained in the halogen-containing resin composition of the present invention by adding it to the halogen-containing resin obtained after polymerization of a monomer for preparing the halogen-containing resin. The polyol can be added to the halogen-containing resin as a powder or viscous liquid or alternatively a solution of water or an organic solvent.

In the halogen-containing resin composition of the present invention, the polyol has a molecular weight of 2,000 or less, preferably 1,500 or less, particularly preferably 1,000 or less. Its molecular weight of more than 2,000 leads to deterioration in long-term thermal stability. The lower limit of its molecular weight is preferably, but not limited to, 100 in the light of preventing its bleed out or volatilization from the halogen-containing resin composition.

In the halogen-containing resin composition of the present invention, a hydroxyl content in the polyol molecule is 10% by weight or more, preferably 15% by weight or more, more preferably 20% by weight or more. A hydroxyl content of less than 10% by weight leads to deterioration in long-term thermal stability. Meanwhile, the hydroxyl content is generally 60% by weight or less. A hydroxyl content (% by weight) of a polyol can be determined from the following equation.

(Hydroxyl content)={(the total weight of hydrogen and oxygen atoms forming hydroxyl groups contained in one polyol molecule)/(the molecular weight of the polyol)}×100.

Examples of a polyol contained in a halogen-containing resin composition of the present invention include glycerol, diglycerol, a polyglycerol having three or more glycerol repeating units, an aliphatic carboxylate of glycerol, an aliphatic carboxylate of diglycerol, an aliphatic carboxylate of a polyglycerol having three or more glycerol repeating units, an alkyl ether of glycerol, an alkyl ether of diglycerol, an alkyl ether of a polyglycerol having three or more glycerol repeating units, erythritol, xylitol, sorbitol, mannitol, pentaerythritol, an aliphatic carboxylate of pentaerythritol, dipentaerythritol, an aliphatic carboxylate of dipentaerythritol, ribose, deoxyribose, glucose, fructose, galactose and trehalose. Among these polyols, sorbitol, diglycerol, a polyglycerol having three or more glycerol repeating units and dipentaerythritol are preferable in the light of maintaining excellent thermal stability for a long period, and sorbitol and dipentaerythritol are more preferable in the light of handleability. The above esters and ethers mentioned as a polyol are products of partial esterification or etherification of multiple hydroxyl groups in a polyol molecule before the esterification or the etherification, which thus have a plurality of hydroxyl groups.

A content of the polyol in the halogen-containing resin composition is 0.01 to 2.5 parts by weight, preferably 0.05 to 2 parts by weight based on 100 parts by weight of the halogen-containing resin. A polyol content of less than 0.01 part by weight leads to insufficient long-term thermal stability, while the content of more than 2.5 parts by weight leads to tendency to coloration of a molded article made of a halogen-containing resin composition, or its volatilization from the halogen-containing resin composition or a molded article therefrom or its bleed out on the surface.

One feature of the halogen-containing resin composition of the present invention is that it contains the polyol described above in combination with the above PVA. The halogen-containing resin composition can have thus sufficient thermal stability even when it is molded at a low temperature. As a result, an applicable temperature range in the molding process can be extended. Furthermore, when the halogen-containing resin composition contains the polyol in combination with the above PVA, adhesion of a sticky material on the inside of an extruder during molding is reduced and coloration of a molded article obtained is also reduced.

There are no particular restrictions to a weight ratio of the PVA to the polyol, but the ratio preferably meets the condition: (a weight of the PVA)/(a weight of the polyol)=30/70 to 90/10, more preferably 35/65 to 85/15, further preferably 40/60 to 80/20, particularly preferably 45/55 to 80/20, most preferably 50/50 to 80/20 in the light of further improvement in thermal stability even by molding at a low temperature and further prevention of adhesion of a sticky material on the inside of an extruder during molding.

Zinc Compound

There are no particular restrictions, but a zinc compound is suitably contained in the halogen-containing resin composition of the present invention by adding it to the halogen-containing resin obtained after polymerization of a monomer for preparing the halogen-containing resin. The zinc compound can be added to the halogen-containing resin as a powder, or a solution and/or dispersion of water or an organic solvent.

In the halogen-containing resin composition of the present invention, the zinc compound can be a zinc salt of an organic acid and an inorganic zinc salt. Examples of the zinc salt of the organic acid include a zinc salt of an aliphatic carboxylic acid such as zinc stearate, zinc laurate and zinc oleate; a zinc salt of an aromatic carboxylic acid such as zinc benzoate and zinc p-t-butylbenzoate; a zinc salt of an amino acid; and a zinc salt of a phosphoric acid monoester or a phosphoric acid diester. Examples of the inorganic zinc salt include zinc oxide and zinc carbonate. Among these, a zinc salt of an aliphatic carboxylic acid is preferable and zinc stearate is more preferable.

A content of the zinc compound in the halogen-containing resin composition is 0.01 to 5 parts by weight, preferably 0.05 to 3 parts by weight based on 100 parts by weight of the halogen-containing resin. A zinc compound content of less than 0.01 part by weight leads to insufficient effect for thermal stabilization, while a content of more than 5 parts by weight is undesirable because a molded article made of the halogen-containing resin composition is blackened.

For incorporating the PVA, the polyol and the zinc compound into the halogen-containing resin, it is suitable to add the PVA, the polyol and the zinc compound to the halogen-containing resin. Thus, the present invention can be more effective.

Although the halogen-containing resin composition of the present invention can consist of the halogen-containing resin, the PVA, the polyol and the zinc compound, it can contain further common additives such as lubricants, stabilizers, plasticizers, phenolic antioxidants, phosphorous antioxidants, ultraviolet absorbers, light stabilizers, antifog agents, antistatics, flame retardants, modifiers, reinforcements, pigments and blowing agents. Furthermore, the halogen-containing resin composition of the present invention can contain additional resins other than those described above.

A proportion of the total of the halogen-containing resin, the PVA, the polyol and the zinc compound to the halogen-containing resin composition of the present invention is preferably within the range of 50 to 100% by weight, more preferably 70 to 100% by weight, further preferably 80 to 100% by weight.

Examples of the lubricant include hydrocarbons such as liquid paraffin, natural paraffin, micro wax and polyethylene wax; fatty acids such as stearic acid and lauric acid; fatty acid amides such as stearic amide, palmitic amide, methylenebisstearoamide and ethylenebisstearoamide; fatty acid esters of monoalcohol, such as butyl stearate; fatty acid esters of a polyol with a hydroxyl content of less than 10% by weight such as hydrogenated castor oil, ethylene glycol monostearate, glycerin monostearate and triethylene glycol di-2-ethylhexanoate; and alcohols such as cetyl alcohol and stearyl alcohol. Among these, a fatty acid ester of a polyol with a hydroxyl content of less than 10% by weight is preferably used. This compound is preferably a fatty acid monoester of a polyol, more preferably a fatty acid monoester of glycerol. A fatty acid in the fatty acid ester of a polyol is preferably that having 8 to 22 carbon atoms, more preferably stearic acid. Among these compounds, glycerol monostearate is particularly suitable. A content of the above lubricant is preferably 0.001 to 10 parts by weight, more preferably 0.05 to 5 parts by weight based on 100 parts by weight of the halogen-containing resin.

The stabilizer can be selected from known stabilizers; specific examples include organic metal salts such as soaps of alkaline earth metal including calcium soap and barium soap, aluminum soap, and organic phosphoric acid metal salts; inorganic metal salts such as metal oxide, metal hydroxide, metal carbonate, and inorganic complex metal salts including zeolite; halogen oxy acid salts such as barium chlorate, barium perchlorate and sodium perchlorate; and non-metallic stabilizers such as β-diketone and epoxy compounds.

Examples of the plasticizer include ester-based plasticizers such as an ester of an acid including phthalic acid, trimellitic acid, pyromellitic acid, adipic acid, sebacic acid, and azelaic acid, and a single linear or branched alkyl alcohol, or a mixture thereof including n-propanol, isopropanol, n-butanol, isobutanol, t-butanol, n-pentanol, isopentanol, t-pentanol, n-hexanol, isohexanol, n-heptanol, isoheptanol, n-octanol, isooctanol, 2-ethylhexanol, n-nonanol, isononanol, n-decanol, isodecanol, lauryl alcohol, myristyl alcohol, palmityl alcohol and stearyl alcohol, and an ester of butanediol and adipic acid; epoxy-based plasticizers such as epoxidized soybean oil, epoxidized linseed oil, epoxidized castor oil, epoxidized linseed oil fatty acid butyl, octyl epoxy stearate, epoxy triglyceride, diisodecyl epoxy-hexahydrophthalate, or a low molecular weight reaction product resin of bisphenol A with epichlorohydrin; and phosphate-based plasticizers such as tricresyl phosphate, trixylenyl phosphate, monobutyl dixylenyl phosphate and trioctyl phosphate.

The phenolic antioxidant can be any of those commonly used, including 2,6-di-t-butyl-p-cresol, 2,6-diphenyl-4-octadecyloxyphenol, stearyl (3,5-di-t-butyl-4-hydroxyphenyl)-propionate, distearyl (3,5-di-t-butyl-4-hydroxybenzyl)phosphonate, thiodiethylene glycol bis[(3,5-di-t-butyl-4-hydroxyphenyl)propionate], 1,6-hexamethylene bis[(3,5-di-t-butyl-4-hydroxyphenyl)propionate], 1,6-hexamethylene bis[(3,5-di-t-butyl-4-hydroxyphenyl)propionic acid amide], 4,4'-thiobis(6-t-butyl-m-cresol), 2,2'-methylene bis(4-methyl-6-t-butylphenol), 2,2'-methylene bis(4-ethyl-6-t-butylphenol), bis[3,3-bis(4-hydroxy-3-t-butylphenyl)butyric acid]glycol ester, 2,2'-ethylidene bis(4,6-di-t-butylphenol), 2,2'-ethylidene bis(4-s-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(3,5-di-t-butyl-4-hydroxybenzyl)-2,4,6-trimethylbenz ene, 1,3,5-tris[(3,5-di-t-butyl-4-hydroxyphenyl)propionyloxyethyl]isocyanurate, tetrakis [methylene-3-(3,5-di-t-butyl-4-hydroxyphenyl)propionate] methane, 2-t-butyl-4-methyl-6-(2-acryloyloxy-3-t-butyl-5-methylbenzyl)phenol, 3,9-bis[1,1-dimethyl-2-{(3-t-butyl-4-hydroxy-5-methylphenyl)propionyloxy}ethyl]-2,4,8,10-tetraoxaspiro[5.5]undecane, and triethylene glycol bis[(3-t-butyl-4-hydroxy-5-methylphenyl)propionate]. A content of the phenolic antioxidant is preferably 0.01 to 5 parts by weight, more preferably 0.1 to 3 parts by weight based on 100 parts by weight of the halogen-containing resin.

The phosphorous antioxidant can be any of those commonly used, including trisnonylphenyl phosphite, tris(2,4-di-t-butylphenyl)phosphite, tris[2-t-butyl-4-(3-t-butyl-4-hydroxy-5-methylphenylthio)-5-methylphenyl]phosphite, tridecyl phosphite, octyl diphenyl phosphite, di(decyl) monophenyl phosphite, di(tridecyl)pentaerythritol diphosphite, distearyl pentaerythritol diphosphite, di(nonylphenyl) pentaerythritol diphosphite, bis(2,4-di-t-butylphenyl) pentaerythritol diphosphite, bis(2,6-di-t-butyl-4- methylphenyl)pentaerythritol diphosphite, bis(2,4,6-tri-t-butylphenyl)pentaerythritol diphosphite, tetra(tridecyl)isopropylidenediphenol diphosphite, tetra(tridecyl)-4,4'-n-butylidenebis(2-t-butyl-5-methylphenol)diphosphite, hexa(tridecyl)-1,1,3-tris(2-methyl-4-hydroxy-5-t-butylphenyl) butane triphosphite, tetrakis(2,4-di-t-butylphenyl) biphenylene diphosphonite, 9,10-dihydro-9-oxa-10-phosphaphenanthrene-10-oxide, and 2,2'-methylenebis(4-methyl-6-t-butylphenyl)-2-ethylhexyl phosphite. A content of the phosphorous antioxidant is preferably 0.001 to 5 parts by weight, more preferably 0.005 to 3 parts by weight based on 100 parts by weight of the halogen-containing resin.

Examples of the ultraviolet absorber include 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2-hydroxyphenyl)benzotriazoles such as 2-(2-hydroxy-5-t-octylphenyl)benzotriazole, 2-(2-hydroxy-3,5-di-t-butylphenyl)-5-chlorobenzotriazole, 2-(2-hydroxy-3-t-butyl-5-methylphenyl)-5-chlorobenzotriazole, 2-(2-hydroxy-3,5-dicumylphenyl)benzotriazole, 2,2'-methylenebis(4-t-octyl-6-benzotriazolyl)phenol, and a polyethylene glycol ester of 2-(2-hydroxy-3-t-butyl-5-carboxyphenyl)benzotriazole; benzoates such as phenyl salicylate, resorcinol monobenzoate, 2,4-di-t-butylphenyl-3,5-di-t-butyl-4-hydroxybenzoate, and hexadecyl-3,5-di-t-butyl-4-hydroxybenzoate; substituted oxanilides such as 2-ethyl-2'-ethoxyoxanilide, and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate. A content of the ultraviolet absorber is preferably 0.005 to 10 parts by weight, more preferably from 0.01 to 5 parts by weight based on 100 parts by weight of the halogen-containing resin, and even.

Examples of the light stabilizer include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl) butanetetracarboxylate, tetrakis(1,2,2,6,6-pentamethyl-4-piperidyl)butanetetracarboxylate, bis(1,2,2,6,6-pentamethyl-4-piperidyl)-di(tridecyl)-1,2,3,4-butanetetracarboxylate, bis(1,2,2,6,6-pentamethyl-4-hydroxybenzyl)malonate, a 1-(2-hydroxyethyl)-2,2,6,6-tetramethyl-4-piperidinol/diethyl succinate polycondensation product, a 1,6-bis(2,2,6,6-tetraethyl-4-piperidylamino)hexane/dibromoethane polycondensation product, a 1,6-bis(2,2,6,6-tetramethyl-4-piperidylamino)hexane/2,4-dichloro-6-morpholino-s-triazine polycondensation product, a 1,6-bis(2,2,6,6-tetramethyl-4-piperidylamino)hexane/2,4-dichloro-6-t-octylamino-s-triazine polycondensation product, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, and 1,6,11-tris[2,4-bis(N-butyl-N-(1,2,2,6,6-pentamethyl-4-piperid yl)amino)-s-triazine-6-ylamino]undecane. A content of the light stabilizer is preferably 0.001 to 5 parts by weight, more preferably 0.05 to 3 parts by weight based on 100 parts by weight of the halogen-containing resin.

The halogen-containing resin composition of the present invention can be processed by extrusion processing, calender processing, blow molding, press processing, powder molding, injection molding, or the like.

A molded article of the present invention is made of the above halogen-containing resin composition. The molded article can have a shape including, but not limited to, a pellet, a film, a sheet, a pipe, a tube and other various three-dimensional configurations.

EXAMPLES

The present invention will be further detailed with reference to Examples. In Examples and Comparative Examples described below, part (s) and % represent parts by weight and % by weight, respectively, unless otherwise stated.

Analytical Method for a PVA

Unless otherwise stated, a PVA was analyzed in accordance with JIS K6726.

Example 1

Production of Polyvinyl Chloride

In deionized water was dissolved a polyvinyl alcohol with a polymerization degree of 850 and a saponification degree of 72 mol % to the amount equivalent to 600 ppm to vinyl chloride, to prepare a dispersion stabilizer. The dispersion stabilizer thus prepared was placed in a glass-lined autoclave to which an antifouling agent, NOXOL WSW (from CIRS Inc.) was applied to 0.3 g/m$^2$ as a solid. Then, to the glass-lined autoclave was added 0.04 part of a 70% solution of diisopropyl peroxydicarbonate in toluene, and the autoclave was degassed to an internal pressure of 0.0067 MPa for removing oxygen, 30 parts of vinyl chloride was added and then the content in the autoclave was heated to 57° C. with stirring to initiate polymerization. At the beginning of the polymerization, an internal pressure of the autoclave was 0.83 MPa. At 7 hr after the polymerization initiation, an internal pressure of the autoclave was 0.44 MPa, at which the polymerization was terminated, and then unreacted vinyl chloride was removed, a polymerization reaction mixture was collected and dried at 65° C. overnight to give a polyvinyl chloride (PVC).

Production of a PVA

In a 6 L reactor equipped with a stirrer, a nitrogen inlet, an additive inlet and an initiator inlet were placed 900 g of vinyl acetate and 2,100 g of methanol, and then the mixture was heated to 60° C. and the system atmosphere was replaced with nitrogen by bubbling nitrogen into the system for 30 min. An internal temperature of the above reaction vessel was regulated to 60° C. and then 2.3 g of 2,2'-azobis(4-methoxy-2,4-dimethylvaleronitrile) was added to initiate polymerization. During the polymerization, a polymerization temperature was kept at 60° C. and after 5 hours, a polymerization conversion reached 70% at which the system was cooled to terminate the polymerization. Then, unreacted vinyl acetate was removed under reduced pressure to give a solution of a polyvinyl acetate (PVAc) in methanol. To a PVA solution with an adjusted concentration of 30% was added a solution of NaOH in methanol (concentration: 10%) such that an alkali molar ratio (a molar number of NaOH/a molar number of a vinyl ester unit in the PVAc) was 0.006 for saponification. The PVA obtained was washed with methanol. By the above process, a PVA with a polymerization degree of 320 and a saponification degree of 80 mol % was obtained.

Production of a Polyvinyl Chloride Composition and a Molded Article (Sheet) Therefrom In a magnetic beaker were added 100 parts of the polyvinyl chloride produced above, 0.75 part of the PVA produced above, 0.25 part of commercially available sorbitol, 1 part of commercially available zinc stearate and 0.5 part of commercially available calcium stearate, and they were blended to give a polyvinyl chloride composition.

The polyvinyl chloride composition thus prepared was kneaded by a test roll at 160° C. for 5 min to produce a sheet with a thickness of 0.45 mm.

Thermal Stability Test

The above sheet was cut into a 50×70 mm piece, which was placed in a gear oven and heated at a temperature of 180° C., measuring a time taken for making the whole piece black (blackening time) as an indicator of thermal stability. The evaluation results are shown in Table 1.

Colorability Test

The above sheet was cut into 45×30 mm pieces, and 12 to 14 pieces thus obtained were stacked and pressed at 185° C. for 5 min to produce a test piece with a thickness of 5 mm, which were visually compared for coloration and evaluated in accordance with the following criteria. The evaluation results are shown in Table 1.

A: substantially uncolored
B: slightly colored
C: yellow
D: yellowish brown

Evaluation of Adhesion of a Sticky Material

For evaluating a degree of adhesion of a sticky material to the inside of the extruder and the like during kneading the above polyvinyl chloride composition, the surface of the test roll used in the kneading of the polyvinyl chloride composition was visually observed and a degree of adhesion of a sticky material to the test-roll surface was evaluated in accordance with the following criteria. The evaluation results are shown in Table 1.

A: No adhesion
B: Slight adhesion
C: Much adhesion

Examples 2 to 8

A polyvinyl chloride was produced and shaped into a sheet as described in Example 1, except that the type of a polyol used and the contents of the PVA, the polyol and zinc stearate were changed as shown in Table 1. The sheet was subjected to a thermal stability test, a colorability test and sticky-material adhesion evaluation as described in Example 1. The evaluation results are shown in Table 1.

Comparative Examples 1 to 14

A polyvinyl chloride was produced and shaped into a sheet as described in Example 1, except that the type of a polyol used and the contents of the PVA, the polyol and zinc stearate were changed as shown in Table 1. The sheet was subjected to a thermal stability test, a colorability test and sticky-material adhesion evaluation as described in Example 1. The evaluation results are shown in Table 1.

TABLE 1

| | PVA | | | Polyol | | | | Zinc | Evaluation results | | |
|---|---|---|---|---|---|---|---|---|---|---|---|
| | Polymerization degree | Saponification degree (mol %) | Content[1] (parts by weight) | Identity | Molecular weight | Hydroxyl content[2] (weight %) | Content[1] (parts by weight) | stearate Content[1] (parts by weight) | Thermal stability (Blackening time/min) | Colorability | Evaluation of adhesion of a sticky material |
| Example 1 | 320 | 80 | 0.75 | Sorbitol | 182 | 56 | 0.25 | 1 | 120 | B | A |
| Example 2 | 320 | 80 | 0.25 | Sorbitol | 182 | 56 | 0.75 | 1 | 120 | B | B |
| Example 3 | 320 | 80 | 15 | Sorbitol | 182 | 56 | 0.5 | 2 | 150 | B | A |
| Example 4 | 320 | 80 | 0.75 | Diglycerol | 166 | 41 | 0.25 | 1 | 105 | B | A |
| Example 5 | 320 | 80 | 0.75 | Polyglycerol (Glycerol decamer) | 759 | 27 | 0.25 | 1 | 105 | A | A |
| Example 6 | 320 | 80 | 1 | Polyglycerol (Glycerol eicosamer) | 1500 | 25 | 1 | 2 | 105 | A | B |
| Example 7 | 320 | 80 | 0.75 | Dipentaerythritol | 254 | 40 | 0.25 | 1 | 105 | A | A |
| Example 8 | 320 | 80 | 1.5 | Dipentaerythritol | 254 | 40 | 1 | 2.5 | 150 | A | B |
| Comparative Example 1 | 320 | 80 | 0.75 | — | — | — | — | 1 | 30 | B | A |
| Comparative Example 2 | 320 | 80 | 2 | — | — | — | — | 2 | 45 | B | A |
| Comparative Example 3 | — | — | — | Sorbitol | 182 | 56 | 0.25 | 1 | 45 | C | B |
| Comparative Example 4 | 320 | 80 | 3 | Sorbitol | 182 | 56 | 1 | 2 | 120 | C | B |
| Comparative Example 5 | 320 | 80 | 1 | Sorbitol | 182 | 56 | 3 | 2 | 120 | D | C |
| Comparative Example 6 | 320 | 80 | 0.005 | Sorbitol | 182 | 56 | 1 | 1 | 75 | C | C |
| Comparative Example 7 | 320 | 80 | 1 | Sorbitol | 182 | 56 | 0.005 | 1 | 30 | B | A |
| Comparative Example 8 | — | — | — | Diglycerol | 166 | 41 | 1 | 1 | 60 | C | C |
| Comparative Example 9 | — | — | — | Polyglycerol (Glycerol decamer) | 759 | 27 | 1 | 1 | 30 | B | B |
| Comparative Example 10 | — | — | — | Dipentaerythritol | 254 | 40 | 1 | 1 | 75 | A | B |
| Comparative Example 11 | 320 | 80 | 1 | Glycerol monostearate | 359 | 9 | 1 | 2 | 30 | B | B |
| Comparative | 320 | 80 | 1 | Polyglycerol | about 3700 | about 24 | 1 | 2 | 45 | B | A |

TABLE 1-continued

| | PVA | | | Polyol | | | | Zinc | Evaluation results | | |
|---|---|---|---|---|---|---|---|---|---|---|---|
| | Polymerization degree | Saponification degree (mol %) | Content[1] (parts by weight) | Identity | Molecular weight | Hydroxyl content[2] (weight %) | Content[1] (parts by weight) | stearate Content[1] (parts by weight) | Thermal stability (Blackening time/min) | Colorability | Evaluation of adhesion of a sticky material |
| Example 12 | | | | (About pentacontamer of glycerol) | | | | | | | |
| Comparative Example 13 | 320 | 80 | 0.75 | Sorbitol | 182 | 56 | 0.25 | 0.005 | 15 | B | B |
| Comparative Example 14 | 320 | 80 | 0.75 | Sorbitol | 182 | 56 | 0.25 | 10 | 45 | B | B |
| Comparative Example 15 | 320 | 55 | 0.75 | Sorbitol | 182 | 56 | 0.25 | 1 | 45 | B | B |

[1] A content (parts by weight) based on 100 parts by weight of PVC
[2] A hydroxyl content (% by weight) in one molecule of a polyol For Examples 1 to 8, polyvinyl chloride compositions containing a PVA having a saponification degree of 80 mol % and a polymerization degree of 320 and also sorbitol, diglycerol, polyglycerol (glycerol decamer or eicosamer) or dipentaerythritol as a polyol were tested and their evaluation results are shown. Any of the polyvinyl chloride compositions exhibited sufficient thermal stability and less adhesion of a sticky material on the test roll surface. The sheets obtained by molding these polyvinyl chloride compositions were less colored.

Comparative Examples 1 to 2 show the evaluation results of polyvinyl chloride compositions free from a polyol. Without a polyol, a blackening time is short which indicates insufficient thermal stability.

Comparative Example 3 shows the evaluation results of a polyvinyl chloride composition free from PVA and containing one part of sorbitol. Without PVA, a blackening time was short which indicates insufficient thermal stability, a sheet was yellowed, and adhesion of much sticky material to the surface of a test roll was observed.

Comparative Example 4 shows the evaluation results of a polyvinyl chloride composition containing 3 parts of PVA and one part of sorbitol. With 3 parts of PVA, a blackening time was sufficiently long, but a sheet was turned to yellow.

Comparative Example 5 shows the evaluation results of a polyvinyl chloride composition containing one part of PVA and 3 parts of sorbitol. With 3 parts of polyol, a blackening time was sufficiently long, a sheet was turned to yellowish brown, and adhesion of much sticky material to the surface of a test roll was observed.

Comparative Example 6 shows the evaluation results of a polyvinyl chloride composition containing 0.005 part of PVA and one part of sorbitol as a polyol. With 0.005 part of PVA, a blackening time was short which indicates insufficient thermal stability, a sheet was turned to yellow, and adhesion of much sticky material to the surface of a test roll was observed.

Comparative Example 7 shows the evaluation results of a polyvinyl chloride composition containing one part of PVA and 0.005 part of sorbitol as a polyol. With 0.005 part of sorbitol, a blackening time was short, which indicates insufficient thermal stability.

Comparative Examples 8 to 10 show the evaluation results of polyvinyl chloride compositions free from PVA and containing diglycerol (Comparative Example 8), polyglycerol (glycerol decamer, Comparative Example 9) or dipentaerythritol (Comparative Example 10) as a polyol. In all samples without PVA, a blackening time was short, which indicates insufficient thermal stability.

Comparative Example 11 shows the evaluation results of a polyvinyl chloride composition containing one part of PVA and one part of glycerol monostearate as a polyol. Glycerol monostearate has a hydroxyl content of 9% by weight. With such a low hydroxyl content in a polyol, a blackening time was short, which indicates insufficient thermal stability.

Comparative Example 12 shows the evaluation results of a polyvinyl chloride composition containing one part of PVA and one part of polyglycerol (about pentacontamer of glycerol) as a polyol. The polyglycerol (about pentacontamer of glycerol) had a molecular weight of about 3,700. With such a large molecular weight of a polyol, a blackening time was short, which indicates insufficient thermal stability.

Comparative Example 13 shows the evaluation results of a polyvinyl chloride composition containing 0.75 part of PVA, 0.25 part of sorbitol as a polyol and 0.005 part of zinc stearate. With a zinc stearate content of 0.005 part, a blackening time was short, which indicates insufficient thermal stability.

Comparative Example 14 shows the evaluation results of a polyvinyl chloride composition containing 0.75 part of PVA, 0.25 part of sorbitol as a polyol and 10 parts of zinc stearate. With a zinc stearate content of 10 parts, a blackening time was short, which indicates insufficient thermal stability.

Comparative Example 15

The PVA shown in Table 1 was produced as described in Example 1, except that in saponification for PVA production, an alkali molar ratio was 0.003 in place of 0.006. This PVA was used as described in Example 1 to prepare a polyvinyl chloride composition, which was processed as described in Example 1 to form a sheet. Then, the sample was subjected to a thermal stability test, a colorability test and evaluation of sticky material adhesion as described in Example 1. The evaluation results are shown in Table 1.

Comparative Example 15 shows the evaluation results of a polyvinyl chloride composition PVA having a saponification degree of 55 mol % and a polymerization degree of 320 and sorbitol as a polyol. With a saponification degree of 55 mol % in PVA, a blackening time was short, which indicates insufficient thermal stability.

As shown in the above examples, a halogen-containing resin composition of the present invention is sufficiently thermally stable even during molding at a relatively lower temperature, so that an applicable molding temperature range is wide. Furthermore, it is very significant because adhesion of a sticky material to the inside of an extruder or the like during molding can be inhibited and a less colored molded article can be obtained.

The invention claimed is:

1. A halogen-comprising resin composition, comprising:
   100 parts by weight of a halogen-comprising resin;
   0.01 to 2.5 parts by weight of a polyvinyl alcohol having a saponification degree of from 60 to 99.9 mol % and a viscosity-average polymerization degree of from 100 to 450, based upon 100 parts by weight of the halogen-comprising resin;
   0.01 to 2.5 parts by weight of a polyol having a molecular weight of 2,000 or less and a hydroxyl content of 10% by weight or more, based upon 100 parts by weight of the halogen-comprising resin; and
   0.01 to 5 parts by weight of a zinc compound, based upon 100 parts by weight of the halogen-comprising resin, wherein
   said zinc compound is selected from the group consisting of a zinc salt of an aliphatic carboxylic acid, a zinc salt of an aromatic carboxylic acid, a zinc salt of an amino acid, a zinc salt of a phosphoric acid monoester, a zinc salt of a phosphoric acid diester, zinc oxide and zinc carbonate.

2. The halogen-comprising resin composition of claim 1, wherein a weight ratio of the polyvinyl alcohol to the polyol is from 30/70 to 90/10.

3. The halogen-comprising resin composition of claim 1, wherein the viscosity-average polymerization degree of the polyvinyl alcohol is from 100 to 320.

4. The halogen-comprising resin composition of claim 1, wherein the polyvinyl alcohol, the polyol, and the zinc compound are contained therein by adding them to the halogen-comprising resin.

5. A process for producing a halogen-comprising resin composition according to claim 1, the process comprising:
   adding to 100 parts by weight of the halogen-comprising resin;
   i) 0.01 to 2.5 parts by weight of said polyvinyl alcohol,
   ii) 0.01 to 2.5 parts by weight of said polyol, and
   iii) 0.01 to 5 parts by weight of said zinc compound, based on 100 parts by weight of the halogen-comprising resin.

6. The process of claim 5, wherein the composition comprises from 0.05 to 2 parts by weight of the polyvinyl alcohol based on 100 parts by weight of the halogen-comprising resin.

7. The process of claim 5, wherein the polyol has a hydroxyl content of 15% by weight or more.

8. The process of claim 5, wherein the polyol has a hydroxyl content of 20% by weight or more.

9. The process of claim 5, wherein the composition comprises from 0.05 to 2 parts by weight of the polyol component based on 100 parts by weight of the halogen-comprising resin.

10. The process of claim 5, wherein the polyol is selected from the group consisting of glycerol, diglycerol, a polyglycerol having three or more glycerol repeating units, an aliphatic carboxylate of glycerol, an aliphatic carboxylate of diglycerol, an aliphatic carboxylate of a polyglycerol having three or more glycerol repeating units, an alkyl ether of glycerol, an alkyl ether of diglycerol, an alkyl ether of a polyglycerol having three or more glycerol repeating units, erythritol, xylitol, sorbitol, mannitol, pentaerythritol, an aliphatic carboxylate of pentaerythritol, dipentaerythritol, an aliphatic carboxylate of dipentaerythritol, ribose, deoxyribose, glucose, fructose, galactose and trehalose.

11. A molded article comprising the halogen-comprising resin composition of claim 1.

12. The halogen-comprising resin composition of claim 1, wherein the composition comprises from 0.05 to 2 parts by weight of the polyvinyl alcohol based on 100 parts by weight of the halogen-comprising resin.

13. The halogen-comprising resin composition of claim 1, wherein the polyol has a hydroxyl content of 15% by weight or more.

14. The halogen-comprising resin composition of claim 1, wherein the polyol has a hydroxyl content of 20% by weight or more.

15. The halogen-comprising resin composition of claim 1, wherein the composition comprises from 0.05 to 2 parts by weight of the polyol component based on 100 parts by weight of the halogen-comprising resin.

16. The halogen-comprising resin composition of claim 1, wherein the polyol is selected from the group consisting of glycerol, diglycerol, a polyglycerol having three or more glycerol repeating units, an aliphatic carboxylate of glycerol, an aliphatic carboxylate of diglycerol, an aliphatic carboxylate of a polyglycerol having three or more glycerol repeating units, an alkyl ether of glycerol, an alkyl ether of diglycerol, an alkyl ether of a polyglycerol having three or more glycerol repeating units, erythritol, xylitol, sorbitol, mannitol, pentaerythritol, an aliphatic carboxylate of pentaerythritol, dipentaerythritol, an aliphatic carboxylate of dipentaerythritol, ribose, deoxyribose, glucose, fructose, galactose and trehalose.

17. The halogen-comprising resin composition of claim 1, which does not contain a β-diketone compound.

* * * * *